(12) United States Patent
Farrugia et al.

(10) Patent No.: US 8,686,062 B1
(45) Date of Patent: Apr. 1, 2014

(54) RADIATION CURABLE RED GEL INK FORMULATIONS

(71) Applicant: Xerox Corporation, Norwalk, CT (US)

(72) Inventors: Valerie M Farrugia, Oakville (CA); C Geoffrey Allen, Waterdown (CA); Jordan H Wosnick, Toronto (CA); Eric Rotberg, Toronto (CA); Karen A Moffat, Brantford (CA); Richard P N Veregin, Mississauga (CA); Suxia Yang, Mississauga (CA); Barkev Keoshkerian, Thornhill (CA); Biby E Abraham, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/667,959

(22) Filed: Nov. 2, 2012

(51) Int. Cl.
- *A61K 6/02* (2006.01)
- *B29D 11/00* (2006.01)
- *C08F 2/46* (2006.01)
- *C08G 61/04* (2006.01)

(52) U.S. Cl.
USPC ............... 522/179; 522/178; 522/1; 520/1

(58) Field of Classification Search
USPC ................. 522/179, 178, 1; 520/1
See application file for complete search history.

(56) References Cited

U.S. PATENT DOCUMENTS

| | | | |
|---|---|---|---|
| 7,365,105 B2 * | 4/2008 | Kiefer-Liptak | 522/121 |
| 2007/0142492 A1 * | 6/2007 | Odell et al. | 522/74 |
| 2011/0262643 A1 * | 10/2011 | Chopra et al. | 427/256 |

* cited by examiner

*Primary Examiner* — Ling Choi
*Assistant Examiner* — Jessica E Whiteley
(74) *Attorney, Agent, or Firm* — MDIP LLC

(57) ABSTRACT

A radiation curable ink including at least one curable monomer, at least one organic gellant, at least one photoinitiator, and a colorant, the colorant includes an orange colorant and an red colorant, where the orange colorant absorbs light having a wavelength of from about 400 to about 560 nm, and where the red colorant absorbs light having a wavelength of from about 460 to 580 nm. The ink substantially matches PANTONE® Red 032 or PANTONE® Warm Red.

19 Claims, No Drawings

RADIATION CURABLE RED GEL INK FORMULATIONS

TECHNICAL FIELD

The disclosure is directed to curable gel inks, such as radiation curable gel inks, and use thereof in forming images, such as, through inkjet printing. The disclosure is directed to red radiation-curable gel inks, where such inks match the color properties of the PANTONE® primaries, Warm Red and Red 032, methods of making such inks and methods of forming images with such inks.

BACKGROUND INFORMATION

There is a need for improved gel ink compositions for higher quality images. While gel ink colors typically include, for example, cyan, magenta, yellow and black gel ink compositions, inks covering more of the red region of the color spectrum are desirable.

However, obtaining PANTONE® Red colorant inks is not trivial as adding a single pigment colorant to an ink formulation because there are significant color differences between, for example, red variants that lie between orange and magenta which can be perceived as different by the naked eye.

As a result, there exists a need to develop colors for radiation curable inks in the red region to achieve higher quality, more accurate images.

SUMMARY

The present disclosure, in embodiments, addresses those various needs and problems by providing red color radiation curable inks.

In embodiments, a radiation curable gel ink is disclosed comprising: at least one curable monomer, at least one organic gellant, at least one photoinitiator, at least one orange pigment and at least one red pigment, where the orange pigment is absorbing in the wavelength region of about 400 to about 560 nm (up to about 5% reflectance), partially transmissive in the region from about 560 to about 570 nm (such that the reflectance is greater than about 5% but less than about 30%) and transmissive in the region from about 570 to 700 nm (such that the reflectance is greater than about 30%), and where the red pigment is minimally transmissive (5-15% reflectance) in the wavelength region of about 380 to about 510, absorbing (<5% reflectance) in the wavelength region of about 510 to about 580 nm, partially transmissive in the wavelength region from about 580 to about 590; and transmissive in the wavelength region from about 590 to about 700 nm.

In embodiments, a method of making a radiation curable ink is disclosed comprising: mixing at least one curable monomer, at least one organic gellant, at least one photoinitiator, at least one orange pigment and at least one red pigment, where the orange pigment is absorbing in the wavelength region of about 400 to about 560 nm (up to about 5% reflectance), partially transmissive in the region from about 560 to about 570 nm (such that the reflectance is greater than about 5% but less than about 30%) and transmissive in the region from about 570 to 700 nm (such that the reflectance is greater than about 30%), and where the red pigment is minimally transmissive (5-15% reflectance) in the wavelength region of about 380 to about 510, absorbing (<5% reflectance) in the wavelength region of about 510 to about 580 nm, partially transmissive in the wavelength region from about 580 to about 590; and transmissive in the wavelength region from about 590 to about 700 nm; heating the mixture; and cooling the heated mixture to form a gel ink, where the resulting ink matches PANTONE® Red 032 or PANTONE® Warm Red in colour within a $\Delta E_{2000}$ of about 3 or less.

Those and other improvements are accomplished by the compositions and methods described in embodiments herein.

DETAILED DESCRIPTION

The disclosure is not limited to particular embodiments described herein, and some components and processes may be varied by one of ordinary skill, based on the disclosure.

The present disclosure provides an ink composition comprising at least one radiation curable gel ink image forming system, typically which have cyan, magenta, yellow and black inks in a four print head system. In digital imaging, those colored inks are generally used by printing halftone dots in varying concentrations and combinations to form the desired color image. While the halftone dots are typically small enough to be indistinguishable, the texture produced by the dots is visible, and may be unacceptable for certain high quality applications, such as printing high quality photographs. In addition to objectionable halftone texture, even small levels of nonuniformity can lead to objectionable visible noise, such as, graininess, mottle etc. The objectionable visible texture and noise may be significantly reduced by the use of colored inks of additional colors, such as, those that are in the red region.

Image quality may be improved by adding one, two or more additional inks to form a system with five, six or more print heads. One color of ink that will provide value and increase image quality is red primaries, including for example, PANTONE® Warm Red and PANTONE® Red 032.

However, obtaining red inks is not as trivial as adding a single pigment colorant to an ink formulation because there are significant color differences between, for example, red variants that lie between orange and magenta that can be perceived as different by the naked eye.

The PANTONE® Matching System of 14 color primaries includes two red variants that lie between orange and magenta on the color wheel. As represented in the iGen PANTONE® book, those colors, PANTONE® Warm Red and PANTONE® Red 032, lie within 5.89 $\Delta E_{2000}$ units of one another, the larger the $\Delta E_{2000}$ value, the larger the color difference. A $\Delta E_{2000}$ of about 2 to about 3 is generally considered to be at the limit of visual perception. Therefore, those two colors are visibly different to the naked eye.

An advantage of radiation curable inks is the reduced jetting and gelling temperatures as compared to previous, standard hot melt jet inks. Standard hot melt jet inks must be jetted at very high temperatures, whereas the presently disclosed jet ink compositions exhibit gel and lower jetting temperatures. Lower gel temperatures can further facilitate smoothing or leveling of the jetted ink by the application of heat.

In the specification and the claims that follow, singular forms, such as, "a," "an," and, "the," include plural forms unless the content clearly dictates otherwise. All ranges disclosed herein include, unless specifically indicated, all endpoints and intermediate values. In addition, reference may be made to a number of terms that shall be defined as follows:

As used herein, "lightfastness," refers to the degree to which a dye resists fading due to light exposure. The Blue Wool Scale measures and calibrates the permanence of coloring dyes. Traditionally, the test was developed for the textiles industry but has now been adopted by the printing industry as a measure of lightfastness of ink colorants. Normally, two identical dye samples are created. One is placed in the dark as the control and the other is placed in the equivalent of sunlight for a 3-month period. A standard blue wool textile fading test card is also placed under the same light conditions as the sample under test. The amount of fading of the sample is then assessed by comparison to the original color. A rating between 1 and 8 is awarded by identifying which one of the eight strips on the blue wool standard card has faded to the same extent as the sample under test. Zero denotes extremely poor color fastness whilst a rating of eight is deemed not to have altered from the original and thus is credited as being lightfast and permanent. A lightfastness of interest is about 6 or greater, about 7 or greater, about 8 or greater. Lightfastness can be measured using the devices available from Microscal Co., London, UK and Q-Lab Corp., Cleveland, Ohio.

The term, "functional group," refers, for example, to a group of atoms arranged in a way that determines the chemical properties of the group and the molecule to which it is attached. Examples of functional groups include halogen atoms, hydroxyl groups, carboxylic acid groups and the like.

The term, "short-chain," refers, for example, to hydrocarbon chains in which n represents the number of carbon atoms in the chain and wherein n is a number of from 1 to about 7, from about 2 to about 5.

The term, "curable," describes, for example, a material that may be cured via polymerization, including, for example, free radical routes and/or in which polymerization can be photoinitiated though use of a radiation-sensitive photoinitiator. The term, "radiation curable," refers, for example, to all forms of curing on exposure to a radiation source, including light and heat sources and including in the presence or absence of initiators. Exemplary radiation curing techniques include, but are not limited to, using ultraviolet (UV) light, for example having a wavelength of about 200 to about 400 nm, or visible light, optionally in the presence of photoinitiators and/or sensitizers, using electron beam radiation, optionally, in the absence of photoinitiators, thermal curing, in the presence or absence of high temperature thermal initiators (and which may be largely inactive at the jetting temperature) and combinations thereof.

As used herein, the term, "viscosity," refers to a complex viscosity, which can be a typical measurement provided by a mechanical rheometer capable of subjecting a sample to a steady shear strain or a small amplitude sinusoidal deformation, where the shear strain is applied by an operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, $\omega$, rather than the transient measurement of, for instance, a capillary viscometer. The reciprocating plate rheometer measures both the in phase and out of phase fluid response to stress or displacement. The complex viscosity, $\eta^*$, is defined as $\eta^*=\eta'-i\eta''$; where $\eta'=G'/\omega$, $\eta''=G''/\omega$ and i is $-1$. Alternatively a viscometer that can measure only the transient measurement of, for instance, a capillary or shear viscosity also can be used.

"Optional," or, "optionally," refers, for example, to instances in which a subsequently described circumstance may or may not occur, and include instances in which the circumstance occurs and instances in which the circumstance does not occur.

The terms, "one or more," and, "at least one," refer, for example, to instances in which one of the subsequently described circumstances occurs, and to instances in which more than one of the subsequently described circumstances occurs.

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein is the term, "equivalent," "similar," "essentially," "substantially," "approximating," and, "matching," or grammatic variations thereof, have generally acceptable definitions or at the least, are understood to have the same meaning as, "about."

One skilled in the art will also readily recognize that where methods or compositions are disclosed, the disclosure encompasses not only such compositions or processes and other subcomponents or positive process steps, but may also exclude one or more components, subcomponents, functional groups or steps therein, as used, for example, in an explicit negative limitation. The disclosure therefore envisages the explicit exclusion of any one or more components, subcomponents, functional groups, elements, species or embodiments, including provisos that may apply to any of the disclosed embodiments, whereby any one or more components, subcomponents, elements, functional groups, species, or embodiments, may be excluded.

Monomers

In embodiments, the ink composition may include one or more monomers or comonomers. The combination of the monomers may aid in solubilizing the gellant material. The comonomers may be chosen from any suitable radiation curable monomers.

In embodiments, ink compositions may comprise a first monomer, selected, for example, to solubilize gellant materials, and gelling properties thereof, such as, epoxy-polyamide composite gellants, which are useful for producing ink compositions including an ink vehicle having a thermally-driven and reversible gel phase, where the ink vehicle is comprised of curable liquid monomers, such as UV curable liquid monomers. The gel phase of such ink compositions allows an ink droplet to be pinned to a receiving substrate. A second monomer can be selected as a design choice to produce a comonomer.

Examples of the curable monomer of the composition include propoxylated neopentyl glycol diacrylate (such as, SR-9003 from Sartomer), diethylene glycol diacrylate, triethylene glycol diacrylate, hexanediol diacrylate, dipropyleneglycol diacrylate, tripropylene glycol diacrylate, epoxylated neopentyl glycol diacrylate, isodecyl acrylate, tridecyl acrylate, isobornyl acrylate, isobornyl(meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl(meth)acrylate and butyl acrylate. In addition, multifunctional acrylate monomers/oligomers may be used not only as reactive diluents, but also as materials that can increase the crosslink density of the cured image, thereby enhancing the toughness of the cured images.

The term, "curable monomer," is also intended to encompass curable oligomers, which may also be used in the composition. Examples of suitable radiation curable oligomers that may be used in the compositions have a low viscosity, for example, from about 50 cPs to about 10,000 cPs, from about 75 cPs to about 7,500 cPs, from about 100 cPs to about 5,000 cPs. Examples of such oligomers include CN549, CN131, CN131B, CN2285, CN3100, CN3105, CN132, CN133 and CN132, available from Sartomer Co., Inc., Exeter, Pa.; EBECRYL 140, EBECRYL 1140, EBECRYL 40, EBECRYL 3200, EBECRYL 3201 and EBECRYL 3212, available from Cytec Industries Inc, Smyrna Ga.; PHOTOMER 3660, PHOTOMER 5006F, PHOTOMER 5429 and PHOTOMER 5429F, available from Cognis Corp., Cincinnati, Ohio; LAROMER PO 33F, LAROMER PO 43F, LAROMER PO 94F, LAROMER UO 35D, LAROMER PA 9039V, LAROMER PO 9026V, LAROMER 8996, LAROMER 8765 and LAROMER 8986, available from BASF Corporation, Florham Park, N.J.; and the like. As multifunctional acrylates and methacrylates, mention may also be made of pentaerythritol tetra(meth)acrylate, 1,2-ethylene glycol di(meth)acrylate, 1,6-hexanediol di(meth)acrylate, 1,12-dodecanol di(meth)acrylate, tris(2-hydroxy ethyl)isocyanurate triacrylate, propoxylated neopentyl glycol diacrylate, hexanediol diacrylate, tripropylene glycol diacrylate, dipropylene glycol diacrylate, amine-modified polyether acrylates (available as PO 83 F, LR 8869 and/or LR 8889, available from BASF Corporation, trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494) and the like.

In embodiments, the monomers may be chosen from short chain alkyl glycol diacrylates or ether diacrylates, such as, propoxylated neopentyl glycol diacrylate, or from acrylates having short-chain alkyl ester substituents, such as, caprolactone acrylate, and the commercially available products CD536, CD 2777, CD585 and CD586, available from Sartomer Co., Inc.

In embodiments, the radiation curable gel ink compositions may include one or more monomers in an amount ranging from about 10% to about 80% by weight of the ink, from about 20% to about 70%, from about 30% to about 60%.

Organic Gellants

In embodiments, the gel ink composition may include at least one optional organic gellant.

The organic gellants functions to increase the viscosity of the ink vehicle and ink composition within a desired temperature range. In embodiments, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions, such as, hydrogen bonding, Van der Waals interactions, aromatic non-bonding interactions, ionic or coordination bonding, London dispersion forces and the like, which on stimulation by physical forces, such as, temperature or mechanical agitation, or chemical forces, such as, pH or ionic strength, can reversibly transition from liquid to semi-solid state at the macroscopic level. The ink compositions exhibit a thermally reversible transition between the semi-solid gel state and the liquid state when the temperature is varied above or below the gel phase transition. The reversible cycle of transitioning between semi-solid gel phase and liquid phase can be repeated many times in the ink composition. Mixtures of one or more gellants may be used to effect the phase change transition.

The phase change nature of the gellant may be used to cause a rapid viscosity increase in the jetted ink composition following jetting of the ink to the substrate. In particular, jetted ink droplets may be pinned into position on a receiving substrate with a cooler temperature than the ink jetting temperature of the ink composition through the action of a phase change transition.

In embodiments, the temperature at which the ink composition forms the gel state is any temperature below the jetting temperature of the ink composition, for example any temperature that is about 10° C. or more below the jetting temperature of the ink composition. In embodiments, the gel state may be formed at temperatures from about 20° C. to about 85° C., from about 30° C. to about 80° C., from about 40° C. to about 75° C. There is a rapid and large increase in ink viscosity on cooling from the jetting temperature at which the ink composition is in a liquid state, to the gel transition temperature at which the ink composition converts to the gel state. The ink composition of some embodiments may show at least about a $10^2$-fold increase in viscosity.

Suitable gellants may gel the monomers/oligomers in the ink vehicle quickly and reversibly, and demonstrate a narrow phase change transition, for example, within a temperature range of about 20° C. to about 85° C. The gel state of exemplary ink compositions should exhibit a minimum of about $10^2$ mPas, such as, about $10^3$ mPas, increase in viscosity at substrate temperatures, for instance, from about 30° C. to about 70° C., compared to the viscosity at the jetting temperature. In embodiments, the gellant-containing ink compositions rapidly increase in viscosity within about 5° C. to about 10° C. below the jetting temperature and ultimately reach a viscosity above about $10^3$ times the jetting viscosity, for example about $10^4$ times the jetting viscosity.

Gellants suitable for use in the ink compositions include a curable gellant comprised of a curable amide, a curable polyamide-epoxy acrylate component and a polyamide component, a curable composite gellant comprised of a curable epoxy resin and a polyamide resin, mixtures thereof and the like, as disclosed in U.S. Pub. No. 20100304040, which is hereby incorporated herein by reference in entirety. Inclusion of the gellant in the composition permits the composition to be applied over a substrate, such as, on one or more portions of the substrate and/or on one or more portions of an image previously formed on the substrate, without excessive penetration into the substrate because the viscosity of the composition is quickly increased as the composition cools following application. Excessive penetration of a liquid into a porous substrate, such as, paper, can lead to an undesirable decrease in the substrate opacity. The curable gellant may also participate in the curing of monomer(s) of the composition.

Gellants suitable for use in the composition may be amphiphilic to improve wetting when the composition is utilized over a substrate having silicone or other oil thereon. For example, the gellants may have long non-polar hydrocarbon chains and polar amide linkages.

Amide gellants suitable for use include those described in U.S. Publ. No. 2008/0122914 and U.S. Pat. Nos. 7,276,614 and 7,279,587, the entire disclosure of each of which is incorporated herein by reference.

The amide gellant may be a compound of the following formula:

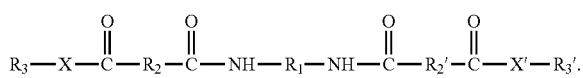

wherein $R_1$ may be:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from 1 to about 12 carbon atoms, such as, from 1 to about 8, from 1 to about 5;

(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from 1 to about 15 carbon atoms, from about 3 to about 10, from about 5 to about 8;

(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as, oxygen, nitrogen, sulfur, silicon, phosphorus, boron and the like either may or may not be present in either the aryl or the alkyl portion of the arylalkylene group) having from about 6 to about 32 carbon atoms, from about 6 to about 22, from about 6 to about 12; or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 to about 32 carbon atoms, from about 6 to about 22, from about 7 to about 15, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring.

In the above formula, $R_2$ and $R_{2'}$, each, independently, may be:

(i) alkylene groups having from 1 to about 54 carbon atoms, from 1 to about 48, from 1 to about 36;

(ii) arylene groups having from about 5 to about 15 carbon atoms, from about 5 to about 13, from about 5 to about 10;

(iii) arylalkylene groups having from about 6 to about 32 carbon atoms, from about 7 to about 33, from about 8 to about 15; or (iv) alkylarylene groups having from about 6 to about 32 carbon atoms, from about 6 to about 22, from about 7 to about 15;

wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring.

In the above formula, $R_3$ and $R_{3'}$, each, independently, may be either:

(a) photoinitiating groups, such as, groups derived from 1-(4-(2-hydroxyethoxy)phenyl)-2-hydroxy-2-methylpropan-1-one, of the formula:

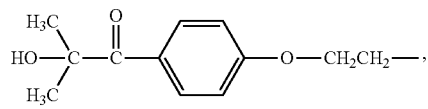

groups derived from 1-hydroxycyclohexylphenylketone, of the formula:

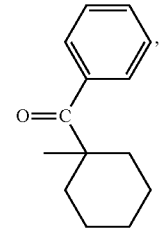

groups derived from 2-hydroxy-2-methyl-1-phenylpropan-1-one, of the formula:

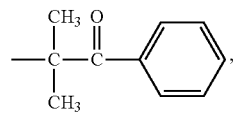

groups derived from N,N-dimethylethanolamine or N,N-dimethylethylenediamine, of the formula:

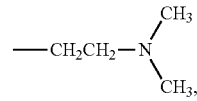

or the like; or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 to about 100 carbon atoms, from about 3 to about 60, from about 4 to about 30;

(ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 to about 100 carbon atoms, from about 5 to about 60, from about 6 to about 30, such as, phenyl or the like;

(iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 to about 100 carbon atoms, from about 5 to about 60, from about 6 to about 30, such as, benzyl or the like; or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 to about 100 carbon atoms, from about 5 to about 60, from about 6 to about 30, such as, tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

In addition, in the above formula, X and X' each, independently of the other, may be an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 to about 100 carbon atoms, from about 5 to about 60, from about 6 to about 30;

(iii) an aryl group, including substituted and unsubstituted aryl groups, and wherein heteroatoms either may or may not be present in the aryl group, having from about 5 to about 100 carbon atoms, from about 5 to about 60, from about 6 to about 30;

(iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 to about 100 carbon atoms, from about 5 to about 60, from about 6 to about 30; or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 to about 100 carbon atoms, from about 5 to about 60, from about 6 to about 30, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Further details may be found, for example, in U.S. Pat. Nos. 7,279,587 and 7,276,614, herein incorporated by reference in entirety.

In embodiments, the gellant may comprise a mixture comprising:

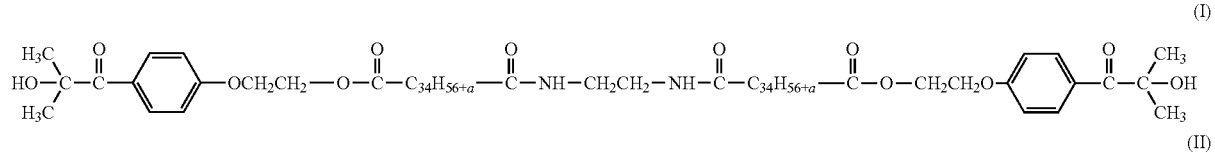

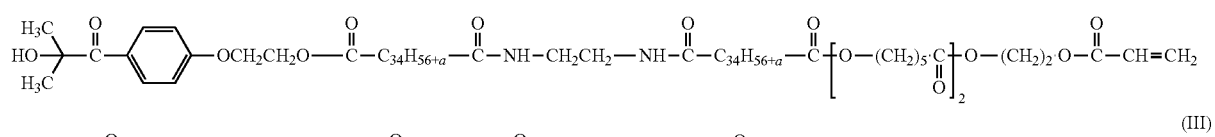

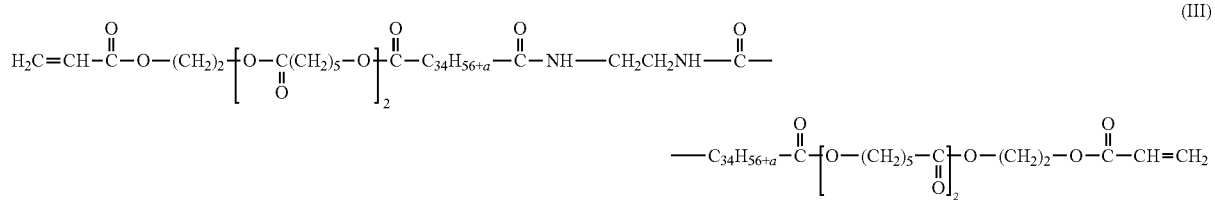

wherein —C$_{34}$H$_{56+a}$— represents a branched alkylene group which may include unsaturations and cyclic groups, wherein the variable "a" is an integer from 0 to about 12.

In embodiments, the gellant may be a composite gellant, for example, comprised of a curable epoxy resin and a polyamide resin. Suitable composite gellants are described in commonly assigned U.S. Publ. No. 2007/0120921, the entire disclosure of which is incorporated herein by reference.

The epoxy resin component in the composite gellant may be any suitable epoxy group-containing material. In embodiments, the epoxy group-containing component comprises the diglycidyl ethers of either a polyphenol-based epoxy resin or a polyol-based epoxy resin, or mixtures thereof. That is, in embodiments, the epoxy resin can have two epoxy groups that are located at the terminal ends of the molecule. The polyphenol-based epoxy resin, in embodiments, is a bisphenol A-co-epichlorohydrin resin with not more than two glycidyl ether terminal groups. The polyol-based epoxy resin may be a dipropylene glycol-co-epichlorohydrin resin with not more than two glycidyl ether terminal groups. Suitable epoxy resins have a weight average molecular weight in the range of from about 200 to about 800, from about 300 to about 700. Commercially available sources of the epoxy resins are, for example, the bisphenol A-based epoxy resins from Dow Chemical Corp. such as, DER 383, or the dipropyleneglycol-based resins from Dow Chemical Corp. such as, DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils, such as, the VIKOFLEX line of products from Arkema Inc., Philadelphia, Pa. also may be used. The epoxy resin component thus is functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in the chemical reaction, and are converted to (meth)acrylate esters by esterification reaction with (meth) acrylic acid.

As the polyamide component of the epoxy-polyamide composite gellant, any suitable polyamide material may be used. In embodiments, the polyamide is comprised of a polyamide resin derived from a polymerized fatty acid, such as, those obtained from natural sources (for example, palm oil, rapeseed oil, castor oil and the like, including mixtures thereof) or the commonly known hydrocarbon, "dimer acid," prepared from dimerized C-18 unsaturated acid feedstocks, such as, oleic acid, linoleic acid and the like, and a polyamine, such as, a diamine (for example, alkylenediamines, such as, ethylenediamine, DYTEK series diamines, poly(alkyleneoxy)diamines and the like, or also copolymers of polyamides, such as, polyester-polyamides and polyether-polyamides. One or more polyamide resins may be used in the formation of the gellant. Commercially available sources of the polyamide resin include, for example, the VERSAMID series of polyamides available from Cognis Corp. (formerly Henkel Corp.), such as, VERSAMID 335, VERSAMID 338, VERSAMID 795 and VERSAMID 963, all of which have low molecular weight and low amine number. The SYLVA-GEL polyamide resins from Arizona Chemical Co., and variants thereof including polyether-polyamide resins may be employed. The composition of the SYLVAGEL resins obtained from Arizona Chemical Company are described as polyalkyleneoxydiamine polyamides.

The gellant may also comprise a curable polyamide-epoxy acrylate component and a polyamide component, such as disclosed, for example, in commonly assigned U.S. Publ. No. 2007/0120924, the entire disclosure of which is incorporated herein by reference. The curable polyamide-epoxy acrylate is curable by virtue of including at least one functional group therein. As an example, the polyamide-epoxy acrylate can be bifunctional. The functional group(s), such as the acrylate group(s), are radiation curable via free radical initiation and enable chemical bonding of the gellant to the cured ink vehicle. A commercially available polyamide-epoxy acrylate is PHOTOMER RM370 from Cognis. The curable polyamide-epoxy acrylate may also be selected from within the structures described above for the curable composite gellant comprised of a curable epoxy resin and a polyamide resin.

The ink composition may include the gellant in any suitable amount, such as, from about 1% to about 50% by weight of the composition. In embodiments, the gellant may be present in an amount of about 2% to about 20% by weight of the composition, about 3% to about 10% by weight of the composition.

Curable Waxes

The ink composition may optionally include at least one curable wax. The wax may be a solid at room temperature (about 25° C.). Inclusion of the wax may promote an increase in viscosity of the ink composition as the composition cools from the application temperature. Thus, the wax may also assist the gellant in avoiding bleeding of the composition through the substrate.

The curable wax may be any wax component that is miscible with the other components and that will polymerize with the curable monomer to form a polymer. The term, wax, includes, for example, any of the various natural, modified natural and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane and the like. The waxes can be synthesized by the reaction of a wax, such as, a polyethylene wax equipped with a carboxylic acid or hydroxyl transformable functional group. The curable waxes described herein may be cured with the above curable monomer(s).

Suitable examples of hydroxyl-terminated polyethylene waxes that may be functionalized with a curable group include, but are not limited to, mixtures of carbon chains with the structure $CH_3$—$(CH_2)_n$—$CH_2OH$, where n can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550, and UNILIN 700 with $M_n$ approximately equal to about 375, 460, 550 and about 700 g/mol, respectively, commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries, Inc., Newark, N.J. PRIPOL 2033 and 1099 can be used and is available from Croda, Edison, N.J. For example, C-36 dimer diol mixtures may be used, including isomers of the formula:

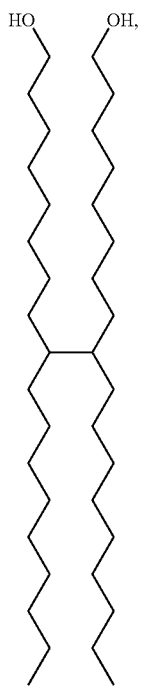 [SMILES: CCCCCCCCCC(CCCCCCCCO)C(CCCCCCCCC)CCCCCCCCO]

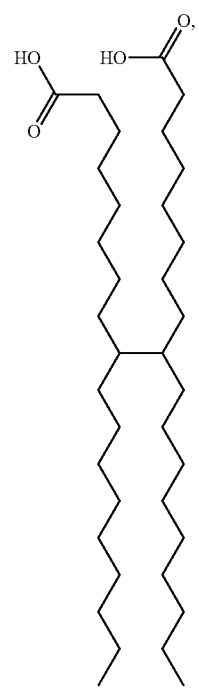 [SMILES: CCCCCCCCCC(CCCCCCCC(=O)O)C(CCCCCCCCC)CCCCCCCC(=O)O]

as well as other branched isomers that may include unsaturations and cyclic groups, available from Uniqema, New Castle, Del. Further information on $C_{36}$ dimer diols of that type is disclosed in, for example, "Dimer Acids," Kirk-Othmer Encyclopedia of Chemical Technology, Vol. 8, $4^{th}$ Ed. (1992), pp. 223 to 237, the disclosure of which is incorporated herein by reference. The alcohols can be reacted with carboxylic acids equipped with UV curable moieties to form reactive esters. Examples of those acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3-(CH_2)_n-COOH$, where there is a mixture of chain lengths, n, where the average chain length is about 16 to about 50, and linear low molecular weight polyethylene, of similar average chain length. Suitable examples of such waxes include, but are not limited to, UNICID 350, UNICID 425, UNICID 550 and UNICID 700 with $M_n$ equal to about 390, 475, 565 and about 720 g/mol, respectively. Other suitable waxes have a structure $CH_3-(CH_2)_n-COOH$, such as, hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries, Inc., Newark, N.J. For example, C-36 dimer acid mixtures may also be used, including isomers of the formula:

as well as other branched isomers that may include unsaturations and cyclic groups, available from Uniqema, New Castle, Del. The carboxylic acids can be reacted with alcohols equipped with UV curable moieties to form reactive esters. Examples of those alcohols include, but are not limited to, 2-allyloxyethanol from Sigma-Aldrich Co.,

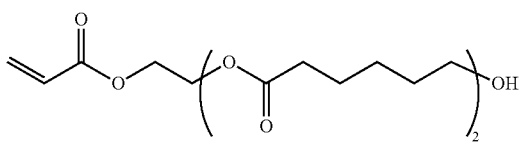

SR495B from Sartomer Company, Inc.;

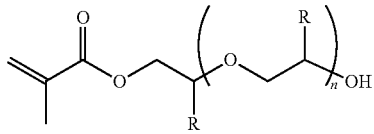

and CD572 (R=H, n=10) and SR604 (R=Me, n=4) from Sartomer Company, Inc.

The curable wax can be included in the composition in an amount of from, for example, about 0.1% to about 30% by weight of the composition, from about 0.5% to about 20%, from about 0.5% to 15%.

Initiators

The radiation curable gel ink may optionally include an initiator, such as, for example, a photoinitiator. In embodiments, such an initiator is desirable for assisting curing of the ink.

In embodiments, a photoinitiator that absorbs radiation, for example, UV light radiation, to initiate curing of the curable components of the ink may be used. Ink compositions containing acrylate groups or inks comprised of polyamides may include photoinitiators, such as, benzophenones, benzoin ethers, benzil ketals, α-hydroxyalkylphenones, α-alkoxyalkylphenones α-aminoallylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl)butanone-1 (available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxycyclohexylphenylketone; benzophenone; 2,4,6-trimethylbenzophenone; 4-methylbenzophenone; diphenyl-(2,4,6-trimethylbenzoyl)phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink, as oxygen inhibits free radical polymerization, consumption thereof increases the speed of polymerization, for example such as ethyl-4-dimethylaminobenzoate and 2-ethylhexyl-4-dimethylaminobenzoate. Those lists are not exhaustive and any known photoinitiator that initiates the free radical reaction on exposure to a desired wavelength of radiation, such as, UV light can be used without limitation.

In embodiments, the photoinitiator may absorb radiation of about 200 to about 420 nm wavelengths to initiate cure, although use of initiators that absorb at longer wavelengths, such as, the titanocenes that may absorb at up to about 560 nm, may also be used without restriction.

The total amount of initiator included in the ink composition may be from, for example, about 0.5 to about 15% by weight of the ink composition, from about 1 to about 10%.

Colorants

In embodiments, the red solid ink includes a mixture of two or more colorants. As used herein the term, "colorant," includes pigments, dyes, mixtures of dyes, mixtures of pigments, mixtures of dyes and pigments, and the like.

In embodiments, "red," inks may be produced that match to PANTONE® Red 032 and PANTONE® Warm Red when printed on standard paper. The inks use standard pigments that are light-fast and known to be compatible with an ink vehicle formulation. More specifically, the inks to produce a red image are comprised of at least one orange pigment and at least one red pigment, where the orange pigment is absorbing in the wavelength region of about 400 to about 560 nm (up to about 5% reflectance), partially transmissive in the region from about 560 to about 570 nm (such that the reflectance is greater than about 5% but less than about 30%) and transmissive in the region from about 570 to 700 nm (such that the reflectance is greater than about 30%), and where the red pigment is minimally transmissive (5-15% reflectance) in the wavelength region of about 380 to about 510, absorbing (<5% reflectance) in the wavelength region of about 510 to about 580 nm, partially transmissive in the wavelength region from about 580 to about 590; and transmissive in the wavelength region from about 590 to about 700 nm.

Measurement of the color can, for example, be characterized by CIE specifications, commonly referred to as CIE L*, a* and b*, where L*, a* and b* are the modified opponent color coordinates which form a 3 dimensional space, with L* characterizing the lightness of a color, a* approximately characterizing the redness/greeness, and b* approximately characterizing the yellowness/blueness of a color.

The pigment concentration can be chosen so that lightness (L*) corresponds with the desired ink mass on the substrate. All of those parameters may be measured with any industry standard spectrophotometer including those obtained, for example, from X-Rite Corp. Color differences may be quantified as ΔE or the color difference between a sample color and a reference color. ΔE may be calculated by any acceptable formula known in the art, for example, by using the CIE $\Delta E_{2000}$ formula. The L*, a* and b* data required for determining $\Delta E_{2000}$ may be calculated, for example, under D50 illuminant and 2° observer, using reflectance spectra which may be measured with a spectrophotometer, for example, a GretagMacbeth SPECTROLINO® spectrophotometer. The L* metric can be from about 49 to about 63, from about 51 to about 61, from about 53 to about 60. The hue angle can be from about 25° to about 39°, from about 27° to about 37°, from about 29° to about 35°.

In red solid ink compositions, the target color for the red may be selected to substantially match or substantially be the same as the color PANTONE® Warm Red and PANTONE® Red 032. Colors are, "substantially," the same when the colors have a $\Delta E_{2000}$ color difference of about 3 or less, of about 2 or less, of about 1 or less. Thus, a red ink may include, for example, inks having similar color compared to the conventional PANTONE® Warm Red or PANTONE® Red 032 color. Thus, in embodiments the red inks achieve L* values and match the color of a particular tint of the conventional PANTONE® Warm Red or PANTONE® Red 032.

In embodiments, red inks may be produced by combining a red or orange colorant with a hue-adjusting colorant and an optional shade-adjusting colorant. Each of the red or orange, hue-adjusting and shade-adjusting colorants may be a single colorant or a combination of colorants, although the red or orange, hue-adjusting and shade-adjusting colorants may different from each other.

In embodiments, the red inks disclosed herein may contain any suitable red or orange colorant. Red or orange colorants include a colorant or combination of colorants that absorb wavelengths of light from about 380 to about 530 nm Red and orange colorants with a significant absorption of light in the wavelength may range from about 380 to about 530 nm may be used. "Significant absorption," in embodiments encompasses absorption which is at least about 80% of the peak absorption in the visible range. Red colorants may include colorants such as C.I. Pigment Red (PR) 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 170:1, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245 and combinations thereof.

The orange colorant may include colorants such as C.I. Pigment Orange (PO) 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66 and combinations thereof.

The red colorant and orange colorant may be present in an amount of from about 0.05% to about 6% by weight of the ink, from about 0.1% to about 3%, from about 0.2% to about 1.5% by weight of the ink.

In embodiments, hue-adjusting colorants for a red ink may include a colorant or combination of colorants composed of at least one orange pigment and at least one red pigment, where the orange pigment is absorbing in the wavelength region of about 400 to about 560 nm (up to about 5% reflectance), partially transmissive in the region from about 560 to about 570 nm (such that the reflectance is greater than about 5% but less than about 30%) and transmissive in the region from about 570 to 700 nm (such that the reflectance is greater than about 30%), and where the red pigment is minimally transmissive (5-15% reflectance) in the wavelength region of about 380 to about 510, absorbing (<5% reflectance) in the wavelength region of about 510 to about 580 nm, partially transmissive in the wavelength region from about 580 to about 590; and transmissive in the wavelength region from about 590 to about 700 nm More specifically, hue-adjusting colorants with a significant absorption of light in the wavelength range from about 380 to about 580 nm may be used. Examples include red and orange colorants such as C.I. Pigment Red 57:1, C.I. Pigment Red 81:2, C.I. Pigment Red 122, C.I. Pigment Red 184, C.I. Pigment Red 185, C.I. Pigment Red 238, C.I. Pigment Red 269, C.I. Solvent Red 49, C.I. Solvent Red 52, C.I. Solvent Red 151, C.I. Solvent Red 155, C.I. Solvent Red 172, C.I. Solvent Orange 41, C.I. Solvent Orange 62 and combinations thereof. The hue-adjusting colorant may be present in an amount of from about 0.001% to about 1% by weight of the ink, from about 0.04% to about 0.2% by weight of the ink.

In embodiments, shade-adjusting colorants for a red ink may include a colorant or combination of colorants that absorb wavelengths of light from about 400 to about 500 nm. More specifically, shade-adjusting colorants with a significant absorption of light in the wavelength range from about 400 to about 500 nm may be used. Examples include yellow, orange, red and black colorants such as C.I. Pigment Yellow 12, C.I. Pigment Yellow 17, C.I. Pigment Yellow 74, C.I. Pigment Yellow 83, C.I. Pigment Yellow 97, C.I. Pigment Yellow 139, C.I. Pigment Yellow 155, C.I. Pigment Yellow 180, C.I. Pigment Orange 2, C.I. Pigment Orange 5, C.I. Pigment Orange 38, C.I. Pigment Orange 64, C.I. Pigment Red 4, C.I. Pigment Red 38, C.I. Pigment Red 66, C.I. Pigment Red 119, C.I. Pigment Red 178, Carbon Black, C.I. Solvent Yellow 16, C.I. Solvent Yellow 93, C.I. Solvent Yellow 104, C.I. Solvent Yellow 163, C.I. Solvent Yellow 141, C.I. Solvent Red 111, C.I. Solvent Black 7, C.I. Solvent Black 27, C.I. Solvent Black 45 and combinations thereof. The shade-adjusting colorant may be present in an amount of from about 0.001% to about 0.6% by weight of the ink, from about 0.003% to about 0.05% by weight of the ink.

In embodiments, the total colorant may comprise from about 0.1% to about 10% by weight of the ink, from about 0.2% to about 5% by weight of the ink.

To obtain a PANTONE® Red 032 curable ink using C.I. PO 34 and C.I. PR 170, the amount of C.I. PO 34, on a wt % basis, is from about 0.5 to about 1.1 wt %, from about 0.6 to about 1 wt %, from about 0.7 to about 0.9 wt %; and the amount of C.I. PR 170 is from about 0.8 to about 1.4 wt %, from about 0.9 to about 1.3 wt %, from about 1 to about 1.2 wt %.

To obtain a PANTONE® Warm Red curable ink using C.I. PO 34 and C.I. PR 170, the amount of C.I. PO 34, on a wt % basis, is from about 0.8 to about 2 wt %, from about 0.9 to about 1.5 wt %, from about 1 to about 1.3 wt %; and the amount of PR 170 is from about 0.5 to about 1.2 wt %, from about 0.6 to about 1 wt %, from about 0.7 to about 0.9 wt %.

Colorants suitable for use herein include pigment particles having an average particle size of from about 15 nm to about 500 nm, from about 50 nm to about 200 nm in volume average diameter.

Additional Additives

The ink vehicles of embodiments may be mixtures of curable components and, optionally, additional materials including curable solids, antioxidants, non-photoinitiated activators (e.g., MARK® K 102, MARK® K 104 available from Galata Chemicals LLC and ACTAFOAM® R-3, available from Chemtura Corp.), as well as any conventional optional additives. Such conventional additives may include, for example, defoamers, slip and leveling agents, pigment dispersants, surfactants, optical brighteners, thixotropic agents, dewetting agents, slip agents, foaming agents, antifoaming agents, flow agents, waxes, oils, plasticizers, binders, electrical conductive agents, fungicides, bactericides, organic and/or inorganic filler particles, UV absorbers, leveling agents, opacifiers, antistatic agents and the like. The inks may also include additional monomeric, oligomeric or polymeric materials as desired.

Curable Solids

Curable solids for use in the radiation curable compositions include radiation curable materials that are solids at room temperature and have one or more unsaturated functional groups therein, such as one or more alkene, alkyne, acrylate or methacrylate reactive groups. In embodiments, the curable solids can be low molecular weight curable solids. As used herein, the term low molecular weight refers to compounds having a weight average molecular weight of about 500 Daltons or less, from about 150 to about 450 Daltons, from about 200 to about 400 Daltons.

In embodiments, the curable solid is an alkyl acrylate, aryl acrylate, alkylaryl acrylate, aryl alkyl acrylate, alkyl methacrylate, aryl methacrylate, alkylaryl methacrylate or aryl alkyl methacrylate.

The curable solid may be present in any effective amount of the curable jet ink compositions, such as, for example, from about 25 wt % to about 75 wt %, from about 30 wt % to about 70 wt %, from about 40 wt % to about 70 wt % of the overall weight of the ink.

Antioxidants

The radiation curable gel ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD 524, NAUGARD 635, NAUGARD A, NAUGARD I-403, and NAUGARD 959, Crompton Corp., Middlebury, Conn.; IRGANOX 1010 and IRGASTAB UV 10, CIBA Specialty Chemicals; GENORAD 16 and GENORAD 40, Rahn A G, Zurich, C H, and the like.

When present, the optional antioxidant is present in the ink compositions of embodiments in any desired or effective amount, such as, at least about 0.01% by weight of the ink composition, at least about 0.1% by weight of the ink composition, at least about 1% by weight of the ink composition.

Ink Preparation

In embodiments, the radiation curable gel inks may be prepared by any suitable technique. For example, the inks may be prepared by mixing the initiator, monomer, optional gellant and the curable wax; and heating the mixture to obtain a single phase with low viscosity. Thereafter, the hot mixture is slowly added to a heated colorant dispersion (which may be a concentrate) while agitating the mixture. The ink composition may then be filtered, optionally at an elevated temperature, through a filter to remove extraneous particles.

The method of preparation for the ink compositions may be modified so as to accommodate the type of reactive gelling agents used for the preparation of the ink compositions. For example, a concentrate of the gelling agent may be prepared in one of the components of the ink composition prior to the addition of the other components. Solutions containing co-gelling agents can also be prepared by a method similar to the one described above. Further examples of ink preparation methods are set forth in the Examples below.

In embodiments, the ink compositions may have gelling temperatures of from about 30° C. to about 75° C., from about 35° C. to about 70° C., from about 45° C. to about 70° C. In embodiments, the ink composition is a gel at room temperature.

In embodiments, when the ink composition is in the gel state, the viscosity of the ink composition is at least about 1,000 mPas, at least about 10,000 mPas, at least about 100,000 mPas. The viscosity values in the gel state of exemplary ink compositions may be in the range of from about $10^3$ to about $10^9$ mPas, from about $10^4$ to about $10^7$ mPas. Gel phase viscosity of embodiments can vary with the print process. For example, the highest viscosities may be suitable for use in embodiments that employ intermediate transfer, or when jetting directly to porous paper to minimize the effects of ink bleed and feathering. On the other hand, less porous substrates, such as plastic, may require lower viscosities that control dot gain and agglomeration of individual ink pixels. The gel viscosity can be controlled by ink composition and substrate temperature. An additional benefit of the gel state for radiation-curable gellant-containing ink compositions is that higher viscosities of about $10^3$-$10^4$ mPas can reduce oxygen diffusion, which leads to a faster rate of cure in free radical initiation.

When the ink composition is at jetting temperature, the ink composition has a viscosity of less than about 15 mPas, less than about 12 mPas, from about 3 to about 12 mPas, from about 5 to about 10 mPas. In embodiments, the ink compositions are jetted at temperatures of less than about 100° C., such as, from about 40° C. to about 100° C., from about 55° C. to about 90° C., less than about 80° C., such as, from about 60° C. to about 80° C.

In embodiments, the red gel ink when printed on paper has a mass of from about 0.1 to about 1.5 mg/cm$^2$, from about 0.4 to about 0.7 mg/cm$^2$.

Image Forming and Inkjet Devices

Gel ink jet printing process and apparatuses are well known in the art and may include either direct or indirect image formation.

Printed images may be generated with the ink described herein by incorporating the ink into an inkjet device, such as a thermal inkjet device, an acoustic inkjet device, a piezoelectric inkjet device and so on, and concurrently causing droplets of molten ink to be ejected in an imagewise manner onto a substrate. In embodiments, the ink may be heated to a jetting temperature, for instance, above the gel transition temperature of the ink composition.

In embodiments, the substrate may be at any suitable temperature during recording. The recording substrate may be at room temperature. However, in embodiments, the substrate may be heated or cooled to have a surface temperature that is, for example, within the range of gel-phase transition temperatures for the ink composition. For example, the substrate may be maintained at a temperature of from about 5° C. to about 160° C., from about 15° C. to about 50° C., from about 20° C. to about 40° C. In that way, the jetted ink may rapidly form a gel.

The ink can be included in at least one reservoir connected by any suitable feeding device to the ejecting channels and orifices of an inkjet head. In the jetting procedure, the inkjet head may be heated, by any suitable method, to the jetting temperature of the inks. The ink reservoir(s) may also include heating elements to heat the ink. The UV inks are thus transformed from the gel state to a molten state for jetting. "At least one," or, "one or more," as used to describe components of the inkjet device, such as the ejecting channels, orifices etc., refers to from about 1 to about 2 million, from about 1000 to about 1.5 million, from about 10,000 to about 1 million of any such component found in the inkjet device, in embodiments from 1 to about 15, from 1 to about 8, from 1 to about 4 of any such component found in the inkjet device.

The inks may also be employed in indirect (offset) printing applications, where droplets of the melted ink are ejected in an imagewise manner onto an intermediate transfer member and the ink in the imagewise pattern is subsequently transferred from the intermediate transfer member to a final recording substrate. An exemplary offset or indirect printing process is disclosed in U.S. Pat. No. 5,389,958, the disclosure of which is incorporated herein by reference.

The intermediate transfer member may take any suitable form, such as a drum or belt. The member surface may be at room temperature or may be heated to have a surface temperature, for example, within the gel state temperature range for the ink compositions. For example, the surface may be maintained at a temperature of about 25° C. to about 100° C., from about 30° C. to about 70° C., from about 30° C. to about 50° C. In that way, the jetted ink may be made to rapidly form a gel, which gel is maintained on the surface of the transfer member until transfer to the image receiving substrate. Thus, the ink may be heated to a jetting temperature, for instance, above the gel transition temperature of the ink composition and then heated to a second temperature at which the gel forms that is less than the first temperature.

Once on the intermediate transfer member surface, the jetted ink may be exposed to a limited extent of radiation so as to effect a limited curing of the ink on the intermediate transfer member surface. That intermediate curing does not fully cure the ink, but merely assists in setting the jetted ink so that the image may be transferred to the image receiving substrate with the appropriate amount of penetration, which requires the ink droplets to have a certain rheology before transfer. For controlling the extent of the curing if an intermediate cure is practiced, reference is made to US Publ. Nos. 2006/0158496 and 2006/0119686, each incorporated herein by reference. The intermediate curing step is not necessary, for example, in embodiments in which the gel state is sufficient to impart the desired rheology to the ink droplets.

Following jetting to the intermediate transfer member and optional intermediate curing thereon, the ink composition is then transferred to a suitable substrate.

The ink can be jetted or transferred onto any suitable substrate or recording sheet to form an image including plain papers, such as, XEROX 4200 papers, XEROX Image Series papers, Courtland 4024 DP paper, ruled notebook paper, bond paper and the like; silica-coated papers, such as, Sharp Co. silica-coated paper, JuJo paper, HAMMERMILL LASERPRINT paper and the like; glossy papers, such as, XEROX Digital Color Gloss, Sappi Warren Papers LUSTROGLOSS and the like; transparency materials; fabrics; textile products; plastics; polymeric films; inorganic substrates, such as, metals, ceramics, wood; and the like.

Following transfer to the substrate or jetting to the substrate if direct printing is employed, the ink is cured by exposing the image on the substrate to radiation. For example, radiation having an appropriate wavelength, mainly the wavelength at which the ink initiator absorbs radiation, may be used. That initiates the curing reaction of the ink composition. The radiation exposure need not be long, and may occur from about 0.05 to about 10 seconds, from about 0.2 to about 2 seconds. The exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms$^{-1}$ would require 1 second for a point on an image to pass under a single unit, while a belt speed 4.0 ms$^{-1}$ would require 0.2 seconds to pass under four bulb assemblies.

In embodiments, the energy source used to initiate crosslinking of the radiation-curable components of the composition may be actinic, such as, radiation having a wavelength in the ultraviolet or visible region of the spectrum; accelerated particles, such as electron beam radiation; thermal, such as heat or infrared radiation; or the like. Actinic radiation provides control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered or focused, if desired or necessary.

The curable components of the ink composition react to form a cured or cross-linked network of appropriate hardness and robustness. In embodiments, the curing is substantially complete to complete, i.e., at least 75% of the curable components are cured (reacted and/or cross-linked). That allows the ink composition to be substantially hardened and scratch resistant, and also adequately controls the amount of showthrough on the substrate.

The following examples of radiation-curable gel ink compositions further illustrate the foregoing embodiments. The Examples are illustrative of different compositions and conditions that can be utilized in practicing the disclosure. It will be apparent, however, that the disclosure can be practiced with many types of compositions and can have many different uses in accordance with the disclosure above.

EXAMPLES

Example 1

Preparation of Ink 1

A pigmented concentrate containing 14.29% of a C.I. Pigment Red 170 and 5.71% of a C.I. Pigment Orange 34 available from Clariant Corporation, 12% of roto-evaporated dispersing agent, EFKA 4340 available from BASF SE, and 68% of monomer, SR-9003 available from Sartomer USA, LLC is processed in a HCPN-1/16 Nano Mill available from the Hockmeyer Equipment Corporation for 4 hours to form Mixture A. To enable the making of a jettable ink, 20 g of Mixture A are placed into a pre-heated vessel with pre-heated stirrer bar and allowed to stir for 10 minutes. To Mixture A are slowly added Mixture B, having already been melted and thoroughly mixed at 90° C., which contains 7.5 g of amide gellant as described in Example 2 of U.S. Pat. No. 7,279,587, the entire disclosure of which is fully incorporated herein by reference, 5 g of acrylate wax as prepared in Example 1 of U.S. Pat. No. 8,207,274, the entire disclosure of which is fully incorporated herein by reference, 3 g of IRGACURE® 379, 1 g of IRGACURE® 819, 3.5 g of IRGACURE® 127, 0.2 g of IRGASTAB® UV10 (all available from BASF SE), and 5 g of SR399LV and 54.8 g of SR9003, available from Sartomer, as monomers. The resultant ink is stirred at 90° C. for 2 hours, before being filtered at 90° C. through a 1 μm glass fiber filter available from Parker-Hannifin Corporation.

Example 2

Preparation of Ink 2

A pigmented concentrate containing 18.18% of a C.I. Pigment Red 170 and 1.82% of a C.I. Pigment Orange 34 available from Clariant Corporation, 12% of roto-evaporated EFKA 4340 available from BASF SE, and 68% SR-9003 available from Sartomer USA, LLC is processed in a HCPN-1/16 Nano Mill available from the Hockmeyer Equipment Corporation for 4 hours to form Mixture C. To enable the making of a jettable ink, 20 g of Mixture C are placed into a pre-heated vessel with pre-heated stirrer bar and allowed to stir for 10 minutes. To Mixture C are slowly added Mixture B, having already been melted and thoroughly mixed at 90° C. as described above. The resultant ink is stirred at 90° C. for 2 hours, before being filtered at 90° C. through a 1 μm glass fiber filter available from Parker-Hannifin Corporation.

Optionally, a non-photoinitiated activator compound may be added during ink base formation to decrease the temperature of decomposition. Suitable such compounds include MARK® K 102 and MARK® K 104 available from Galata Chemicals, LLC, and ACTAFOAM® R-3, available from Chemtura Corp. The amount of activator compound ranges from 1 to 4 wt % of the ink composition.

Evaluation

A standard printing method is used to prepare images using the two UV curable gel inks that very well estimate the color characteristics of PANTONE® Red 032 and PANTONE® Warm Red, such that the color difference between the example inks and those aforementioned PANTONE® reds found in the XEROX IGen3™ color sample book is less than 3 units. Formulations are provided which use C.I. Pigment Red 170 (PR 170) together with C.I. Pigment Orange 34 (PO 34) to prepare one of the two PANTONE® Red colorants. UV inks are prepared and prints produced at the target ink mass per area and the color properties are measured. Table 1 below shows the formulations derived from half toning C.I. PO 34 toner with C.I. PR 170 toner. The formulations are corrected for the anticipated ink mass of 0.9 mg/cm$^2$.

TABLE 1

UV ink formulations.

|  | $\Delta E_{2000}$ (min) based on Half toning | Calculated %-wt PO 34 | Calculated %-wt PR 170 |
|---|---|---|---|
| Ink 1 | <3 | 1.00 | 2.50 |
| Ink 2 | <3 | 0.35 | 3.50 |

Theoretical calculation of %-wt PO 34 and PR 170 in UV ink formulations.

Table 1 above shows the pigment ratios for the two UV curable gel inks that very well estimate the color characteristics of PANTONE® Red 032 and PANTONE® Warm Red. Other formulations are possible, such as, the use of red pigment chosen from the pigment group Naphthol Red, such as, C.I. Pigment Red 170, C.I. Pigment Red 170:1 and the like as the nominal red colorants, and the use of orange pigment chosen from the pigment group Pyrazolone Orange, such as, C.I. Pigment Orange 34. Various other pigments as well as dyes may also be used, although several dyes might not be preferred for UV curing applications due to lightfastness issues.

SUMMARY

A UV curable gel ink formulation that produces machine prints matching the PANTONE® Matching System primary colour PANTONE® Red 032 and PANTONE® Warm Red within 3 $\Delta E_{2000}$ units is disclosed. The formulation provides gamut extension for UV curable gel ink printing in the red region of the colour spectrum.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

We claim herein:

1. A lightfast radiation curable red gel ink, comprising: at least one curable monomer, at least one organic gellant, at least one photoinitiator, at least one orange pigment, and at least one red pigment wherein the orange and red pigments are configured to provide a red color, wherein the orange pigment is absorbing in the wavelength region of about 400 to about 560 nm and transmissive in the region from about 570 to about 700 nm, and wherein the red pigment is absorbing in the wavelength region of about 510 to about 580 nm and transmissive in the wavelength region from about 590 to about 700 nm, wherein the resulting ink matches PANTONE® Red 032 or PANTONE® Warm red in color within a $\Delta E_{2000}$ of about 3 or less.

2. The radiation curable ink of claim 1, wherein the radiation is UV having a wavelength of about 200 to about 400 nm.

3. The radiation curable ink of claim 1, wherein the orange pigment is partially transmissive in the wavelength region of about 560 nm to about 570 nm.

4. The radiation curable ink of claim 1, wherein the red pigment is minimally transmissive from about 380 nm to about 510 nm and partially transmissive in the wavelength region of about 580 nm to about 590 nm.

5. The radiation curable ink of claim 1, wherein the gellant is an amide gellant.

6. The radiation curable ink of claim 1, wherein the red colorant is selected from the group consisting of C.I. Pigment Red (PR) 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 170:1, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245 and combinations thereof.

7. The radiation curable ink of claim 1, wherein the orange colorant is selected from the group consisting of C.I. Pigment Orange (PO) 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 66 and combinations thereof.

8. The radiation curable ink of claim 1, wherein the red or orange colorant is present in an amount of from about 0.05% to about 6% by weight of the ink.

9. The radiation curable ink of claim 1, wherein the at least one curable monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, epoxylated neopentyl glycol diacrylate, isodecyl acrylate, tridecyl acrylate, isobornyl acrylate, isobornyl (meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, and combinations thereof.

10. The radiation curable ink of claim 1, further comprising a wax.

11. The radiation curable ink of claim 1, further comprising a non-photoinitiated activator.

12. The radiation curable ink of claim 1, wherein the radiation curable ink exhibits lightfastness of about 6 or greater on the Blue Wool Scale.

13. The radiation curable ink of claim 1, wherein the radiation curable ink has a hue angle of about 25° to about 39°, and an L* from about 49 to about 63.

14. The radiation curable ink of claim 1, wherein the red colorant is C.I. PR 170 and the orange colorant is C.I. PO 34.

15. The radiation curable ink of claim 1, wherein the PANTONE® Warm Red comprises C.I. PR 170 in an amount of from about 0.5 wt % to about 1.2 wt % and C.I. PO 34 in an amount of from about 0.8 wt % to about 2 wt %.

16. The radiation curable ink of claim 1, wherein the PANTONE® Red 032 comprises C.I. PR 170 in an amount of from about 0.8 wt % to about 1.4 wt % and C.I. PO 34 in an amount of from about 0.5 wt % to about 1.1 wt %.

17. A method of making a red radiation curable ink comprising:
   mixing at least one curable monomer, at least one organic gellant, at least one photoinitiator, at least one orange colorant, and at least one red colorant, wherein the orange and red pigments are configured to provide a red color, wherein the orange colorant is absorbing in the wavelength region of about 400 to about 560 nm and transmissive in the region from about 570 to about 700 nm, and wherein the red colorant is absorbing in the wavelength region of about 510 to about 580 nm and transmissive in the wavelength region from about 590 to about 700 nm;
   heating the mixture; and
   cooling the heated mixture to form a gel ink,
   wherein the resulting ink matches PANTONE® Red 032 or PANTONE® Warm Red in color within a $\Delta E_{2000}$ of about 3 or less.

18. The method of claim 17, wherein the orange colorant is partially transmissive in the wavelength region of about 560 nm to about 570 nm, and wherein the red colorant partially transmissive in the wavelength region from about 580 nm to about 590 nm.

19. The method of claim 17, wherein, the red colorant is C.I. PR 170 and the orange colorant is C.I. PO 34.

* * * * *